United States Patent [19]

Hortenhuber

[11] Patent Number: 4,676,622

[45] Date of Patent: Jun. 30, 1987

[54] HOLDING DEVICE FOR FILM AND VIDEO CAMERAS

[76] Inventor: Emil Hortenhuber, Karl Rader Allee 21, 6702 Bad Durkheim, Fed. Rep. of Germany

[21] Appl. No.: 837,944

[22] Filed: Mar. 10, 1986

[30] Foreign Application Priority Data

Mar. 21, 1985 [DE] Fed. Rep. of Germany ....... 3510141

[51] Int. Cl.⁴ .............................................. G03B 17/00
[52] U.S. Cl. .................................................... 354/293
[58] Field of Search .................................. 354/81, 293

[56] References Cited

U.S. PATENT DOCUMENTS 3,128,982  4/1964  Christopher .................... 354/293 X
4,249,817  2/1981  Blau ................................... 354/293

*Primary Examiner*—Donald A. Griffin
*Attorney, Agent, or Firm*—Kinzer, Plyer, Dorn & McEachran

[57] ABSTRACT

Holding device for film and video cameras, consisting of two similar exchangeable swivel heads, one of which has a housing part 4, a rotating part 5 and a damping element. A frame part 7 or a camera mount 8 is used to connect the two swivel heads and mount camera 1.

7 Claims, 4 Drawing Figures

HOLDING DEVICE FOR FILM AND VIDEO CAMERAS

This invention concerns a new holding device for film and video cameras, consisting of housing parts and rotating parts that can be turned horizontally and vertically relative to each other, and a camera mount is provided on a housing part or a rotating part.

Such holding devices, referred to simply as tripod heads, are essentially available as complete units, where the horizontal rotating component and the vertical swivel component, i.e., the respective bearing and damping, are accommodated in the same frames or housings to some extent. Higher quality tripod heads with hydraulic damping are precision instruments which require a great accuracy in manufacturing and assembly. Accordingly, do-it-yourself, self-repairs are also impossible. Due to the fact that such instruments are often handled roughly, and a precise interplay of friction and bearing is required, damage and wear lead to unacceptable losses of function. Depending on the source of the problem, the entire swivel system with the designs presently available must be sent in for repairs, resulting in down time or unavailability lasting several weeks in most cases.

With the conventional design, the camera is mounted by the swivel axis, which yields very good accessibility to all camera service elements. The disadvantage of this standard design, however, is that beyond a certain swivel range, the camera tilts away. Especially when using heavy cameras with a high center of gravity, even small swivel angles result in a substantial tilting moment which necessitates a constant pressure against the swivel lever accordingly or operation of an obligatory brake. Satisfactory balance with vertical swivel motion is achieved only when the center of gravity of the camera does not coincide with the vertical axis of rotation. With this so-called L type suspension, however, the elevated frame part covers one side of the camera and causes a not insignificant interference with certain operating functions of the camera. Unlike the version with the camera at the top, this yields only a minor shift in film plane or front lens, so this makes it very interesting to have the suspension at the center of gravity, which is usually equivalent to the optical axis, for close range and extremely close-range work.

If all the following advantages are to be utilized by the cameraman:

(1) High availability, simple service,
(2) Good accessibility to the camera mounted on the frame,
(3) Satisfactory vertical balance,
(4) No shift in sharpness with vertical movement at close range, then it is necessary according to the state of the art to have at least two different tripod heads.

This is not only expensive but also creates new problems with regard to availability, since now a double set of equipment must be carried.

This invention is based on the problem of designing a camera holding system of the known type in such a way as to permit satisfactory switching from a basic structure to another structure without high renovation and parts costs, and also to make it possible to carry out a simple exchange when there are problems in function.

This goal is achieved according to this invention by the fact that the two exchangeable swivel heads that consist of a housing part, a rotating part and a damping part for the horizontal and vertical swivel movement can be connected with the help of frame parts.

This invention offers the advantage that a support system is provided for the cameraman or ambitious amateur film makers, thus making it possible to utilize at least optically the advantages listed above. By replacing frame parts or using different combinations of frame parts, support devices for a wide variety of practical applications can be created. The modular design even permits do-it-yourself construction of special systems, in which case the swivel heads must be supplemented only by special supporting parts. In cases of breakdown and damage, the module design permits simple replacement of the respective component, even the otherwise complicated damping and bearing. Since problems can be expected essentially only in the swivel units, it is expedient to supply one swivel head as a replacement for the vertical or horizontal component.

The superfluous damaged unit can then be sent in for repairs, in which case longer waiting times are then of less importance. Optionally a disposable or replacement method of exchanging repaired units might also be used. Other advantages also become apparent in export of the instruments, so that it is no longer necessary to set up representative offices with a repair division.

This invention is now illustrated in the following description with reference to practical examples illustrated in the figures.

Figure 1:
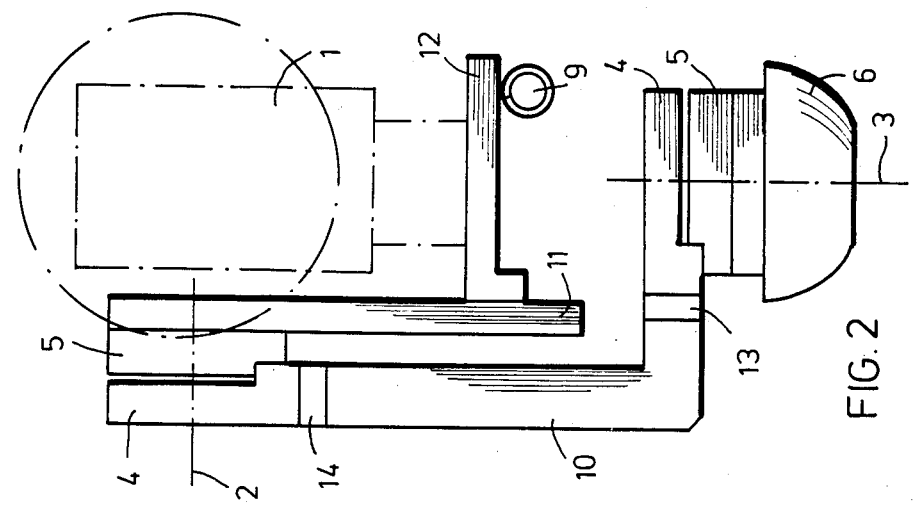
FIG. 1 shows a standard camera holding device in sectional view.

In the standard version of such a camera holding device as shown in FIG. 1, there are two swivel heads of the same type connected to frame parts in such a way that a camera 1 is located above the horizontal swivel axis 2. The other swivel head has a vertical swivel axis 3.

Each swivel head is the same size and shape, so the individual swivel heads are interchangeable and each consists of a housing part 4 as well as a rotating part 5, and a damping element is also provided. The swivel head for the vertical swivel axis 3 is attached to a hemisphere 6 or some other tripod adapters, and then a frame part 7 which is mounted on the bottom of rotating part 5 of the other swivel head is attached to the front side of the housing part 4 in question. The other swivel head in turn has a camera mount 8 on the front side of housing part 4 with the camera 1 attached to it. A lever 9 attached to the support is used to move the camera. In this way, camera 1 can be moved vertically 100° about axis 2 and horizontally 360° about axis 3. With the arrangement of the camera mount 8 as shown with the dash-dot lines, a vertical movement of 360° is possible.

Figure 2:
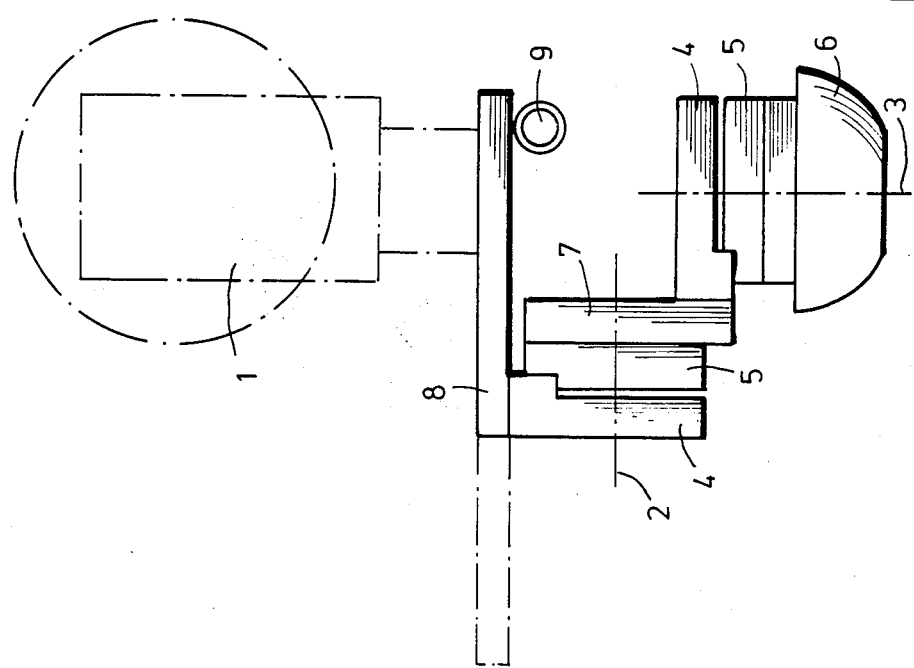
FIG. 2 shows a camera holding device with an L swivel head in sectional view.

In the version according to FIG. 2, the center of gravity of the camera is in the horizontal swivel axis 2, and an L-shaped frame part 10 is attached to the lower swivel head with hemisphere 6 at the front of housing part 4. The other side of this frame part is in turn connected to the front side of housing part 4 of the other swivel head whose rotating part 5 has a frame part 11 that extends downward and is attached to the bottom and has a camera mount 12 attached to the lower end at right angles to this frame part 11. To adjust the camera mount to especially bulky cameras, spacers or stay bolts 13 and 14 can be inserted between frame part 10 and the swivel heads, for example. An even more flexible version is obtained when the horizontal swivel unit with hemisphere 6 is used repeatedly and then the two different vertical versions are exchanged optionally as needed. The vertical swivel units with parts 9, 8 and 7 or vertical swivel unit with parts 9, 12, 11 and 10 then form a preassembled component group that is adjusted to the corresponding camera and can be replaced rapidly.

Figure 3:
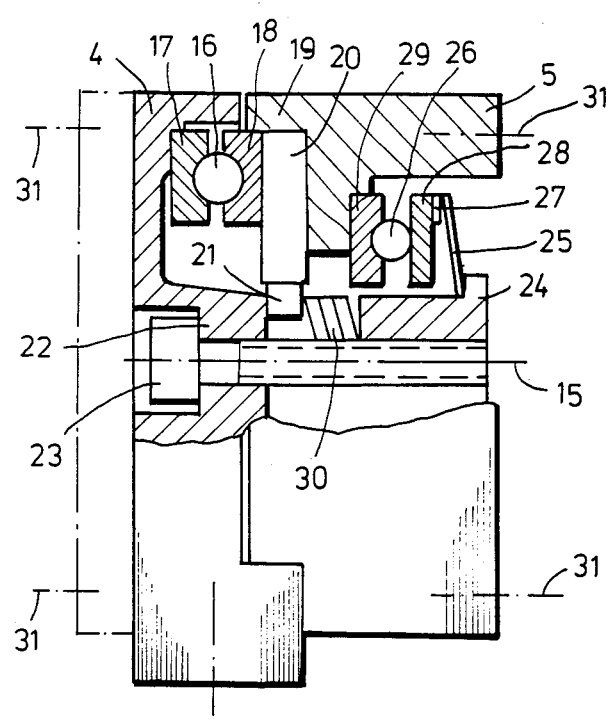
FIG. 3 shows a top view of a swivel head, partially in sectional view.
Figure 4:
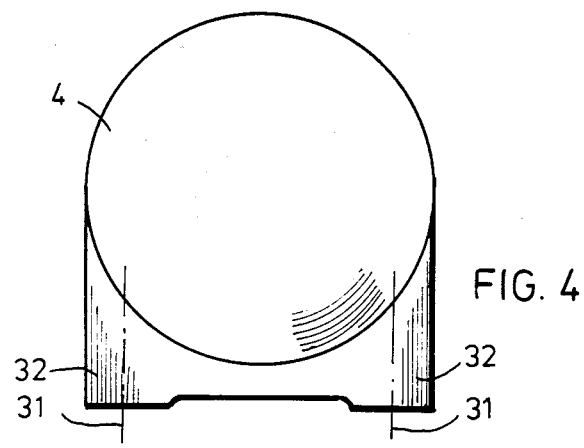
FIG. 4 shows a side view of FIG. 3.

FIGS. 3 and 4 show one possible version for such a standardized swivel head, where housing part 4 and rotating part 5 can be rotated about axis 15 which corresponds to the swivel axes 2 and 3 shown in FIGS. 1 and 2. The two parts 4 and 5 are supported with respect to each other with the help of an axial guide bearing 16, in which case the outside pressure ring 17 is held in a back cut of housing part 4, while the inside pressure ring 18 is held on a shoulder 19 of rotating part 5 with its external periphery. The ring surface is in contact with cushioning outside part 20 which is inserted into rotating part 5 and together with damping inside part 21 forms one damping element. The damping inside part 21 rests on a shoulder 22 of housing part 4. The parts are joined by means of a screw 23 on axis 15 onto which a supporting nut 24 is screwed from the rotating part side and holds a second axial bearing 26 with the help of a plate spring 25. Axial bearing 26 has the function of a step bearing in which case spring 25 presses against the outside pressure ring 28, e.g., using shims 27 to adjust the bearing pressure. If ring 28 is designed with a flat bearing surface, there cannot be any tension or distortion of the two bearings 16 and 26. The inside pressure ring 29 is attached to rotating part 5. Between supporting nut 24 and damping inside part 21, there is a spring package 30, which assures secure pressure even in the event of subsequent settling of material.

Housing parts 4 and rotating parts 5 of the swivel heads are provided with threaded holes 31 at the top and also at the bottom, so the respective frame parts can be attached easily. FIG. 4 shows that the respective bearing flange 32 is drawn out in the manner of a foot for threaded hole 31.

I claim:

1. A holding device for cameras, comprising:
    a pair of interchangeable swivel heads, each having a housing part (4) and a rotating part (5) mounted for rotation on the housing part with a damping element (20, 21) mounted between the housing part and rotating part;
    a frame part (7, 10) connecting the two swivel heads such that the rotational axis of the rotating part in one swivel head is horizontal and the rotational axis of the rotating part in the other swivel head is vertical; and a camera mount (8, 12) connected to a swivel head.

2. The device according to claim 1, characterized by the fact that the swivel heads are the same size and shape.

3. The devices according to claim 2, characterized by the fact that in a swivel head the housing part (4) is supported on rotating part (5) with the help of two bearing assemblies (16, 26), where one bearing assembly (16) is provided between the rotating part and housing part, while the other bearing assembly (26) is provided between the rotating part and a support therefor (24).

4. The device according to claim 1, characterized by the fact that in a swivel head the housing part (4) is supported on rotating part (5) with the help of two bearing assemblies (16, 26), where one bearing assembly (16) is provided between the rotating part and housing part, while the other bearing assembly (26) is provided between the rotating part and a support therefor (24).

5. The device according to claim 4, characterized by the fact that the housing part (4) is joined to rotating part (5) with a screw (23) on the axis of rotation (15) and a supporting nut (24), the bearing assembly (26) including an outer pressure ring (28), and a spring (25) presses against the outer pressure ring (28) of the bearing (26).

6. The device according to claim 5, characterized by the fact that the damping element (20, 21) comprises a ring located between the bearing assembly (16) and a shoulder (19) of the rotating part (5) and also between a shoulder (22) of housing part (4) and supporting nut (24), a compression spring (30) being inserted between the nut and damping element.

7. The device according to claim 1 including a bearing assembly (16) provided between the rotating part and housing part, characterized by the fact that the damping element (20, 21) comprises a ring located between the bearing assembly (16) and a shoulder (19) of the rotating part (5) and also characterized in that a spring (30) acts on the damping element.

* * * * *